July 17, 1934.　　　F. G. G. ARMSTRONG　　　1,967,170

SHOCK ABSORBER

Filed Aug. 23, 1932　　　2 Sheets-Sheet 1

Inventor:
Fullerton G. G. Armstrong,
By Sturtevant, Mason & Rose,
Attorneys.

July 17, 1934.    F. G. G. ARMSTRONG    1,967,170
SHOCK ABSORBER
Filed Aug. 23, 1932    2 Sheets-Sheet 2
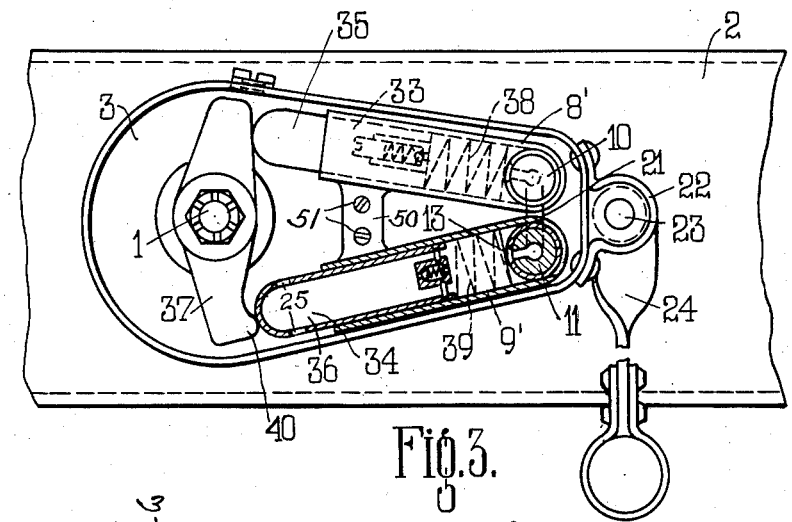
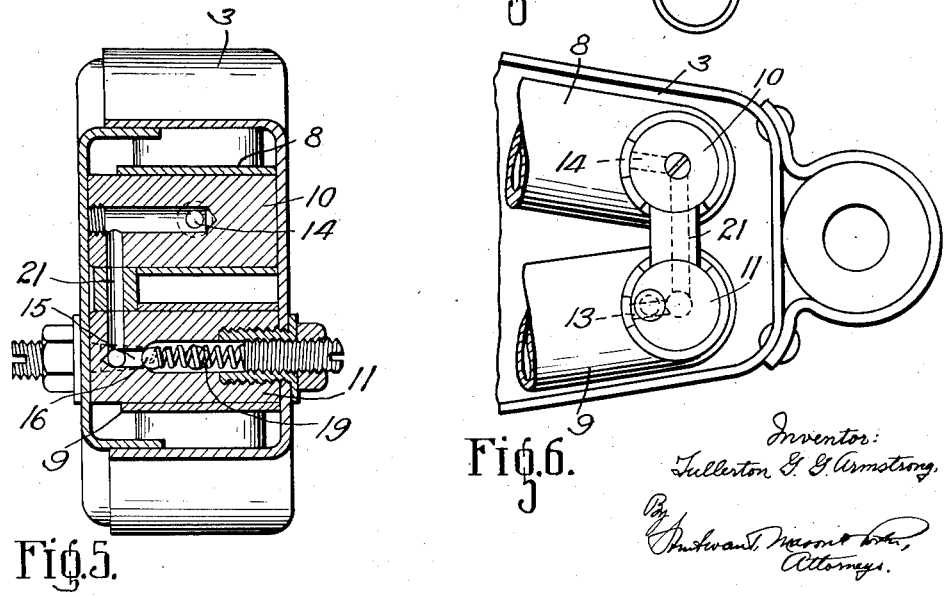

Patented July 17, 1934

1,967,170

UNITED STATES PATENT OFFICE 1,967,170

SHOCK ABSORBER

Fullerton George Gordon Armstrong, Beverley, England

Application August 23, 1932, Serial No. 630,118
In Great Britain May 7, 1932

15 Claims. (Cl. 188—88)

The present invention relates to shock absorbers particularly for automobiles.

An object of the present invention is to provide a shock absorber in which the resistance load is automatically increased upon large and sudden deflections.

A further object of the present invention, in a shock absorber of the hydraulic type wherein liquid is pumped from one chamber to another on actuation, is to provide means whereby additional liquid, in excess of that which can be accommodated in one chamber, may be introduced into the other chamber on the suction period in that chamber.

This may be accomplished by the volumetric displacement in one chamber upon actuation of the shock absorber being made greater than in the other chamber so that in the event of relatively large deflections, in which case on large deflections of the shock absorber a partial vacuum occurs in one chamber, into which liquid in excess of that which can be accommodated in the other chamber with the result that the return stroke of the shock absorber cannot be complete until the excess liquid has leaked away.

If necessary, means may be provided in the chambers to allow slow leakage of the excess liquid introduced into one of the chambers.

The invention is more particularly described with reference to the accompanying drawings in which two forms of the invention are illustrated by way of example and in which:—

Figure 3 is a longitudinal elevation in part section of a third form of construction and Figure 4 is a detail common to the constructions illustrated in Figures 1, 2 and 3 in sectional elevation substantially on line 4—4 of Fig. 1.

Figure 5 is a vertical sectional view substantially on line 5—5 of Fig. 4.

Figure 6 is an enlarged view of the connection between the right hand ends of cylinders 8, 9 of Fig. 1.

Figure 1:
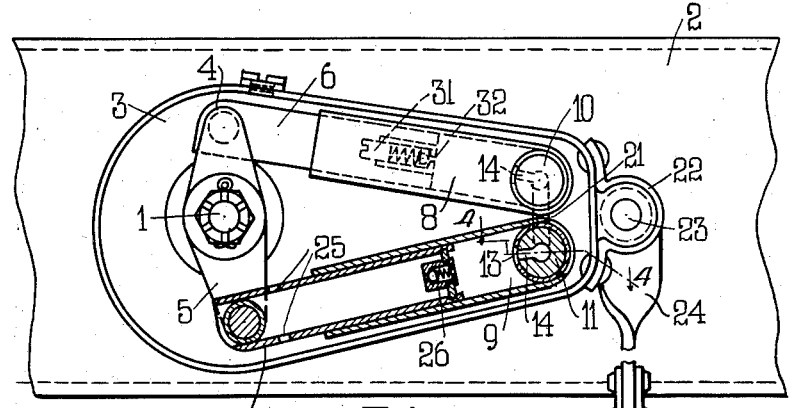
Figure 1 is a longitudinal elevation in part section of a double acting shock absorber.

In the form of construction shown in the drawings the volumetric displacement of the piston in one of the cylinders on displacement of the axle of the vehicle relative to the frame is greater for at least a part of the stroke than the volumetric displacement in the other cylinder with the result that a partial vacuum occurs on the suction stroke in the cylinder having the larger displacement which causes liquid to be drawn into the chamber from the casing. This additional liquid is in excess of the quantity which can be accommodated in the other cylinder and consequently the excess liquid must leak away before the return stroke can be completed.

Referring more in detail to the drawings, in the form of construction shown in Figure 1, a pin 1 is rigidly secured to a frame 2 of the vehicle and a fluid tight casing 3 is rotatably mounted thereon. A two-armed lever 4, 5 is rigidly secured on the pin 1, the arm 5 of which lever is longer than the arm 4. A pair of plungers 6, 7 are pivotally connected to the ends of the arms 4, 5 of the two-armed lever and work in a pair of cylinders 8, 9 pivotally connected to the casing 3 through plugs 10, 11 secured to such casing. The lever 4, 5 is denominated herein as being of the first order of levers, by virtue of the fact that its pivot 1 is intermediate the ends, and these ends operate to displace the plungers 6, 7 in their cylinders 8, 9 upon angular displacement of the casing about said pivot 1. The head end of each cylinder is provided with a cylindrical bush 12 (Figure 4) having a port 13 therein which registers with a port 14 in the plugs 10, 11.

Figure 4:
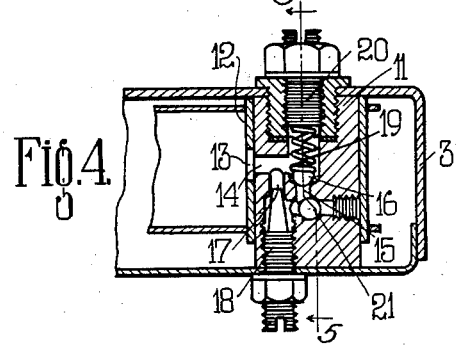

The plug 11 which is specifically illustrated in detail in Figure 4 is provided with a one-way valve 15 controlled by a ball 16. A conduit 21 communicates with a loaded valve which is preferably in the form of a restricted passage 17 which is controlled by an adjustable tapered metering needle 18 and with the valve 15. The ball 16 is controlled by a spring 19 adjustable by means of a screw 20 in the plug 11.

The conduit 21 connects the plugs 10 and 11 and communicates directly with the port 14 in the plug 10 and by way of the valve 15 and the restricted passage 17 with the port 13 in the plug 11. The plunger 7 which is hollow has openings 25 in the lower end thereof for drawing fluid from the sump provided by the casing 3, and a non-return valve 26 in the head.

The end of the casing is provided with a bracket 22 which rotatably accommodates a pin 23 secured to a link 24 which is pivotally connected to the axle of the vehicle.

Figure 2:
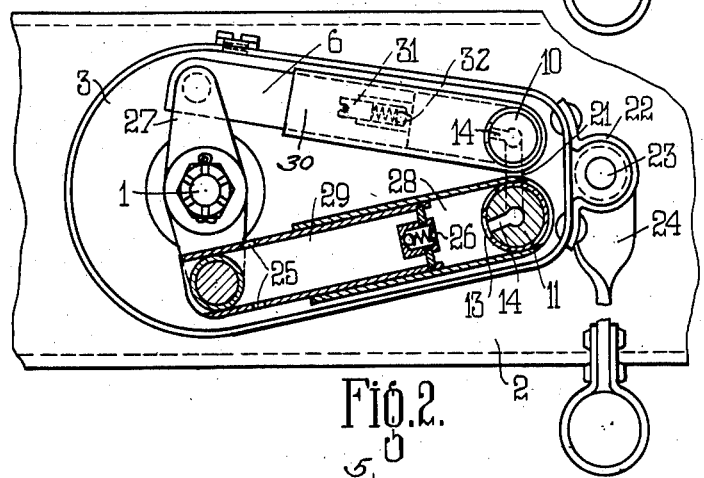
Figure 2 is a similar view of a second form of construction.

In the construction illustrated in Figure 2 the general arrangement is the same as that in Figure 1, but with the exception that the two arms of the two armed lever 27 are of the same length and the extra volumetric capacity of one of the cylinders is obtained in that the cylinder 28 and the plunger 29 working therein is of greater diameter than the cylinder 30. Except in these two respects the construction illustrated in Figure 2 is identical with the construction illustrated in Figure 1 and the same reference numerals have been used in both figures, to indicate similar parts.

In the construction illustrated in Figure 3 the plungers 33, 34 which act in cylinders 8', 9', are rounded at the ends 35, 36 and are urged against a two armed lever 37 by springs 38, 39. The cylinders 8', 9' are interconnected by a web 50 which is secured to the casing by means of screws 51: this construction is feasible as the lever 37 is not connected to the rounded ends 35, 36 and hence relative movements of the cylinders 8' and 9' is not required. The two armed lever 37 acts as a cam surface one end of which actuating the plunger 34 has a bull nose 40 which imparts a quicker movement to the plunger 34 than to the plunger 33 for at least a part of the stroke of the shock absorber. In other respects the shock absorber illustrated in Figure 3 is identical with that described with reference to Figure 1.

The operation of the shock absorber illustrated in Figure 1 is as follows:—

On normal deflection fluid is pumped from the cylinder 8 through the ports 13 and 14 in the plug 10 along the conduit 21 and into the cylinder 9 by two paths (1) through valve 16 against the load of the spring 19, (2) through the restricted passage 17 and on the return stroke fluid is forced from the cylinder 9 into the cylinder 8 by a single path through the restricted passage 17. The volumetric displacement in the cylinder 9 is greater than that in the cylinder 8 due to the greater stroke imparted to the plunger 7 by the longer arm 5 of the two-armed lever 4, 5, so that a partial vacuum is created in the cylinder 9 on the suction stroke and if this partial vacuum is great enough the valve 26 is opened and a quantity of excess oil is drawn therethrough into the cylinder 9. On normal small deflections the quantity of oil drawn in is negligible but on large deflections a considerable quantity of excess oil is drawn into the cylinder 9 and on the return stroke the quantity of oil delivered for a given deflection by the cylinder 9 is greater than that which can be accommodated in the cylinder 8 and consequently a quantity of oil must leak away before the return stroke of the shock absorber can be completed. Thus a considerable resistance is offered to the return of the shock absorber to the other end position after it has suffered a large deflection. Normally the leakage past the plungers 6 and 7 will be found to be sufficient but if desired a non-return valve 31 heavily loaded and controlling a small orifice 32 in the head of the plunger 6 may be provided to release fluid slowly from the cylinder when the pressure exceeds a predetermined value.

If a rapid series of large shocks are imposed on the vehicle the resistance of the shock absorber builds up due to the fact that there is not sufficient time for the excess oil to leak away.

The operation of the shock absorber shown in Figure 2 is identical with that described with reference to Figure 1. In the construction shown in Figure 2, however, the larger volumetric displacement in the cylinder 28 is due to its greater diameter the longitudinal displacement of the plungers 6, 29 being the same in each cylinder 30, 28.

In the construction in Figure 3 the greater displacement of the plunger 34 is obtained in that at least a part of the stroke of that plunger is executed at a greater speed than the stroke of the plunger 33 with the result that the quantity of liquid which the plunger 34 attempts to pump into the cylinder 8' is in excess of that which can be accommodated in the cylinder 8' due to the less rapid displacement of the plunger 33 therein.

It will be obvious that the invention may be applied to shock absorbers other than that illustrated in the drawings and in fact to shock absorbers generally in which fluid is pumped from one chamber to another on actuation.

I declare that what I claim is:—

1. A shock absorber comprising a pair of interconnected chambers, means for pumping fluid from one chamber into the other chamber on actuation of the shock absorber, means for providing two paths of travel for fluid from one chamber to the other and including a device for closing one said path against movement of fluid from said other chamber into said one chamber and a device for controlling the flow through the other said path, externally accessible means for regulating the said devices, means to introduce into one chamber during the suction period therein liquid in excess of that which can be accommodated in the other chamber, and exhaust means permitting gradual escape of the excess liquid from said chambers.

2. A shock absorber comprising a pair of interconnected chambers, means displaceable in said chambers for pumping liquid from one chamber to the other chamber and back on actuation of the shock absorber in two directions having a greater volumetric displacement in one chamber than in the other chamber for at least a part of the stroke of the shock absorber, means for providing two paths of travel for fluid from one chamber to the other and including a device for closing one said path against movement of fluid from said other chamber into said one chamber and a device for controlling the flow through the other said path, externally accessible means for regulating the said devices, and means to introduce liquid into said one chamber on the suction stroke.

3. A shock absorber comprising a pair of interconnected chambers, means for pumping fluid from one chamber to the other chamber on actuation of the shock absorber, having greater volumetric displacement in one of said chambers than in the other of said chambers, two devices for regulating the flow between said chambers, one of said devices operating to meter the flow from one chamber to the other in either direction and the other said device including a non-return valve preventing flow into said chamber of greater volumetric displacement and permitting said flow from said chamber of greater volumetric displacement at a predetermined pressure, externally accessible means for regulating said devices for varying the metering and for varying said pressure, means for introducing liquid into said one chamber during the suction period in that chamber in excess of that which can be accommodated in said other chamber and exhaust means permitting gradual escape of the excess liquid from said chambers.

4. A shock absorber comprising a pair of interconnected chambers, pumping means having unequal volumetric displacement in said chambers and displaceable therein to pump fluid positively from one chamber to the other and back on actuation of the shock absorber in both directions, a plurality of externally accessible means for regulating said flow and including a non-return valve for preventing flow back into the chamber of greater displacement and a device for regulating the pressure at which fluid flows through said non-return valve from said chamber of greater displacement and a device for metering the flow between said chambers in either direction, means to introduce additional liquid into that chamber wherein the volumetric displacement of the said pumping means is greater, during the suction period in said chamber, and exhaust means permitting gradual leakage of the excess liquid from said chambers.

5. A shock absorber comprising a pair of interconnected chambers, pumping means in said chambers displaceable therein to pump liquid from one chamber to the other and back on actuation of the shock absorber in both directions and having a greater volumetric displacement in one chamber than in the other, a liquid reservoir, means to introduce liquid from the said liquid reservoir into said one chamber, during the suction period in that chamber, in excess of that which can be accommodated in said other chamber, a plurality of externally accessible means for differentially regulating the flow between said chambers, and exhaust means permitting gradual escape of the excess liquid from said chambers.

6. A shock absorber comprising a pair of interconnected chambers, pumping means in said chambers to pump liquid from one chamber to the other and back on actuation of the shock absorber in both directions and having a greater volumetric displacement in one chamber than in the other, a liquid reservoir, means to introduce liquid from said liquid reservoir into the said one chamber, during the suction period, in excess to that which can be accommodated in the other chamber, a plurality of externally accessible means for differentially regulating the flow between said chambers, and leakage means to allow the slow escape of the excess liquid from said chambers.

7. A shock absorber comprising a pair of interconnected cylinders and a pair of plungers displaceable in said cylinders to pump liquid from one cylinder into the other cylinder and back on actuation in both directions, means to impart a greater displacement to one of said plungers than to the other on actuation of the shock absorber, a liquid reservoir, a plurality of externally accessible means for differentially regulating the flow between said chambers, and means to introduce liquid in excess of that which can be accommodated in the other cylinder into the cylinder whose plunger has the greater displacement on the suction stroke in that cylinder.

8. A shock absorber comprising a pair of interconnected cylinders, a pair of plungers displaceable in said cylinders to pump liquid from one cylinder into the other cylinder and back upon actuation of the shock absorber in both directions, an unequal armed lever of the first order connected at its ends to said plungers to produce the displacement of the said plungers in the said cylinders upon actuation of the shock absorber, a non-return valve in the cylinder whose plunger is connected to the longer arm of said two-armed lever, and a liquid reservoir in connection with said non-return valve.

9. A shock absorber comprising a pair of interconnected cylinders, a pair of plungers displaceable in said cylinders, a cam displaceable with respect to said plungers on actuation of the shock absorber and engaging said plungers to cause a greater displacement of one of said plungers than the other of said plungers for at least a part of the stroke of the shock absorber, a plurality of externally accessible means for differentially regulating the flow between said chambers, and means to introduce liquid in said cylinders on the suction stroke of said plunger having the greater displacement.

10. A shock absorber comprising a pair of hydraulically connected cylinders, a liquid tight casing enclosing said cylinders, a link pivotally connected to said casing, an element adapted to rotate relatively to said cylinders upon displacement of said casing, a pair of plungers pivotally connected to said element at spaced points at unequal distances from the centre of rotation of said cylinders about said element so that said plungers have unequal displacements in said cylinders on actuation of the shock absorber, and a non-return valve connecting the cylinder whose plunger has the greater displacement to the interior of said fluid tight casing.

11. A shock absorber comprising a pair of hydraulically interconnected cylinders, a liquid tight casing enclosing said cylinders and pivotally connected to one end of said cylinders, an unequal armed lever of the first order, rotatable with respect to said cylinders upon actuation of the shock absorber and pivotally connected at its ends to said plungers, a non-return valve in the plunger connected to the longer arm of said lever connecting the cylinder in which it works with the interior of said casing, and valve means regulating the flow of liquid from one of said cylinders to the other.

12. A shock absorber comprising a liquid tight casing, a cylinder pivotally mounted in said casing, a second and relatively greater diameter cylinder pivotally mounted in said casing and hydraulically connected to said first cylinder, a plunger displaceable in said first cylinder to pump liquid into said second cylinder, a second and larger plunger displaceable in said second cylinder to pump liquid into said first cylinder, a reservoir and means to introduce liquid into said second cylinder on the suction stroke in excess to that which can be accommodated to said first cylinder.

13. A shock absorber comprising a liquid tight casing, a cylinder pivotally mounted in said casing, a second and relatively greater diameter cylinder pivotally mounted in said casing and a plunger displaceable in said first cylinder to pump liquid into said second cylinder, a second and larger plunger displaceable in said second cylinder to pump liquid into the said first cylinder, a member rotatable relatively to said cylinders upon displacement of said casing and pivotally connected to said plungers at spaced points thereon, and a non-return valve in said second cylinder connecting the interior of said casing with said cylinder.

14. A shock absorber comprising a liquid tight casing, a cylinder pivotally mounted in said casing, a second and relatively greater diameter cylinder pivotally mounted in said casing, a plunger displaceable in said first cylinder to pump liquid into said second cylinder, a second plunger displaceable in said second cylinder to pump liquid into the said first cylinder, a two-armed lever rotatable relatively to said cylinders upon displacement of said casing and pivotally connected at its end to said plungers and a non-return valve in said second cylinder connecting the interior of said casing with said second cylinder.

15. A shock absorber comprising a liquid tight casing, a link pivotally connected to one end of said casing, a shaft rotatably mounted in said casing and projecting therethrough a two-armed lever rigidly secured to said shaft, a pair of plungers pivotally connected to the ends of said two-armed lever, a cylinder pivotally mounted in said casing and engaging one of said plungers, a second and relatively greater diameter cylinder engaging the other of said plungers and hydraulically connected to said first cylinder, a non-return valve in said second cylinder connecting it with the interior of said liquid tight casing and valve means controlling the flow of liquid between said cylinders on actuation of the shock absorber.

FULLERTON GEORGE
        GORDON ARMSTRONG.